April 26, 1966 R. A. HANSON 3,247,771
DIRECTIONAL CONTROL APPARATUS
Filed Sept. 21, 1964 8 Sheets-Sheet 1

INVENTOR.
RAYMOND A. HANSON
BY
ATTYS.

April 26, 1966  R. A. HANSON  3,247,771
DIRECTIONAL CONTROL APPARATUS
Filed Sept. 21, 1964  8 Sheets-Sheet 2

INVENTOR.
RAYMOND A. HANSON
BY
ATTYS.

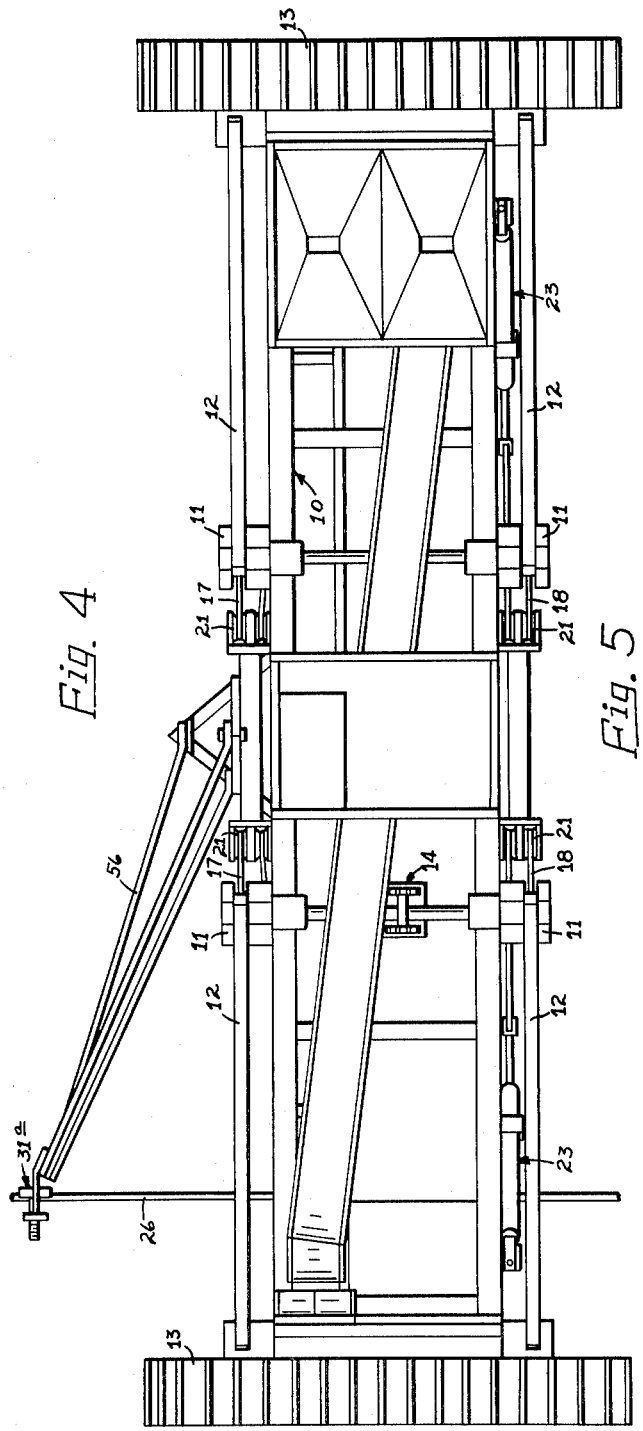
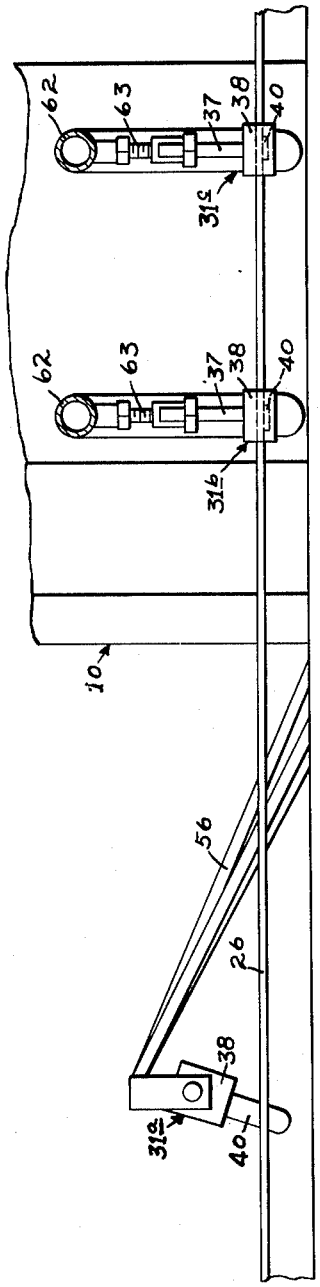
Fig. 4
Fig. 5
INVENTOR.
RAYMOND A. HANSON

April 26, 1966 R. A. HANSON 3,247,771
DIRECTIONAL CONTROL APPARATUS
Filed Sept. 21, 1964 8 Sheets-Sheet 5

INVENTOR.
RAYMOND A. HANSON
BY *Wells & St.John*
ATTYS.

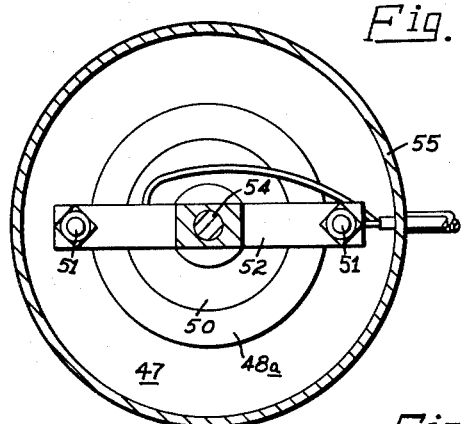
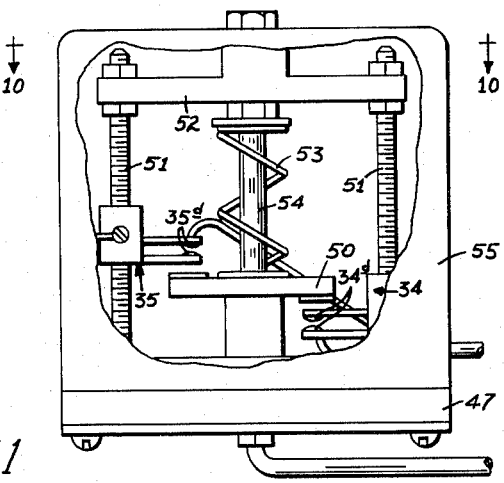
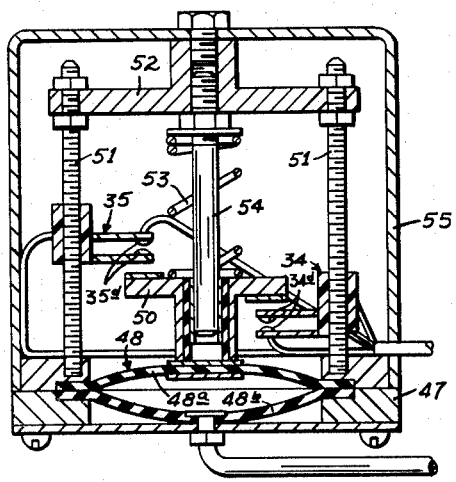

April 26, 1966   R. A. HANSON   3,247,771
DIRECTIONAL CONTROL APPARATUS
Filed Sept. 21, 1964   8 Sheets-Sheet 7

INVENTOR.
RAYMOND A. HANSON
BY Wells & St. John
ATTYS.

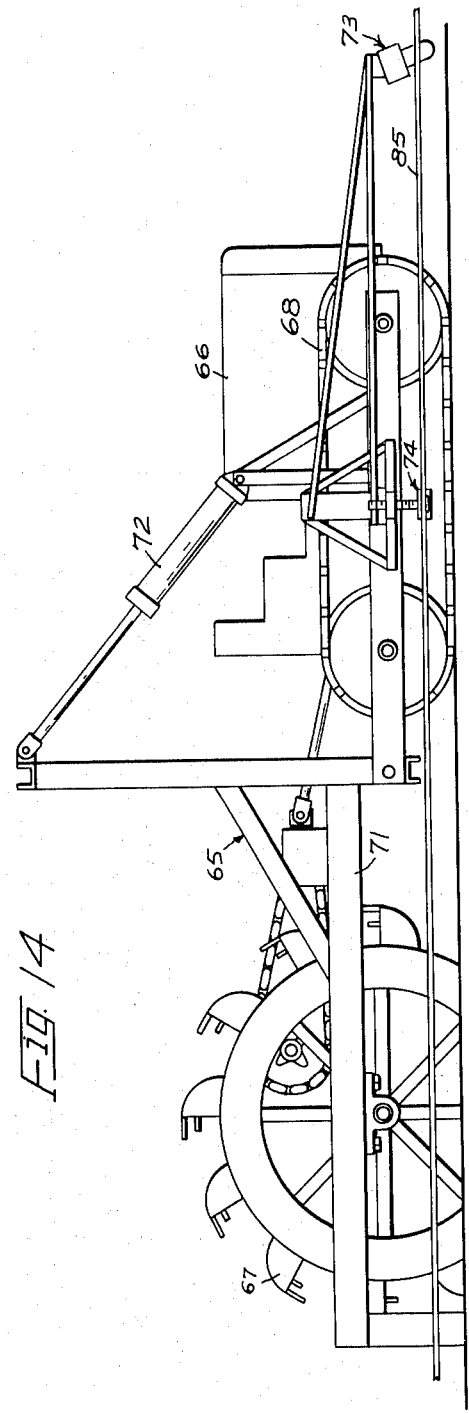
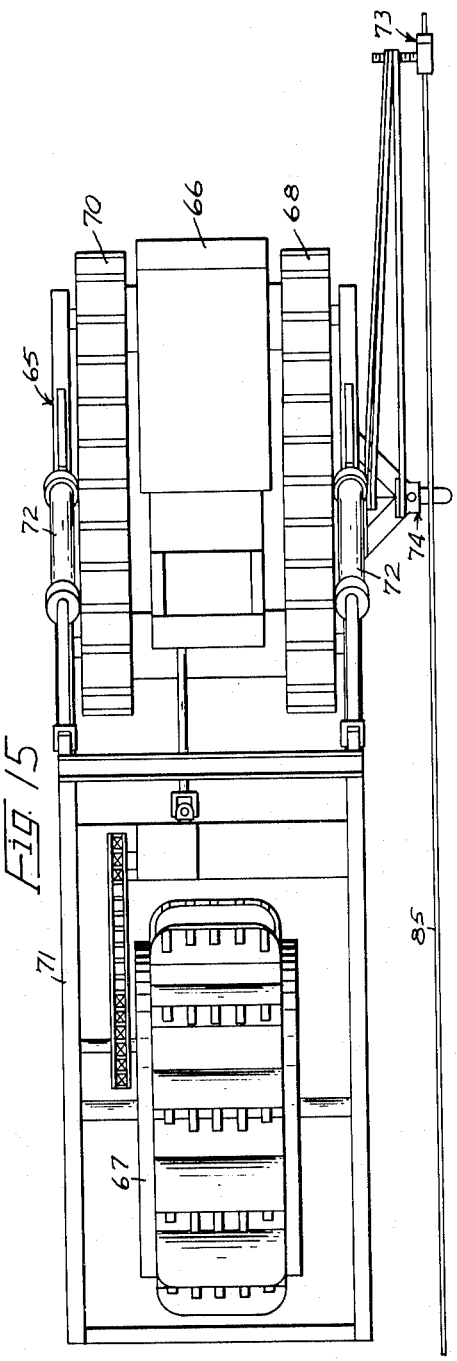

# United States Patent Office 3,247,771
Patented Apr. 26, 1966

3,247,771
DIRECTIONAL CONTROL APPARATUS
Raymond A. Hanson, % R. A. Hanson Co.,
Palouse, Wash.
Filed Sept. 21, 1964, Ser. No. 401,755
6 Claims. (Cl. 94—46)

This is a continuation in part of application Ser. No. 154,678, filed November 24, 1961, now abandoned.

This invention relates to a novel directional control apparatus for controlling mobile surfacing machinery.

The present invention relates to a control system for machines designed to surface or line continuous areas of soil or other substances. An example of such a machine is a canal slip form which is designed to produce a continuous lining along a precut trench. Another machine for which the present invention is particularly adapted is a digging machine for producing such a trench or a trench of any other desired configuration. The basic concepts of this invention have wide application in road building machinery or any other applications where a constant grade or directional control is desirable. The control assembly described below automatically guides the mobile unit along a straight line in any desired plane.

It is a first object of this invention to provide a directional control apparatus of high sensitivity and with few moving parts. The sensitivity of this apparatus is achieved by the use of a differential air pressure system guided along a fixed locus through a simple mechanical arrangement. This differential air pressure system may be utilized to control any desired electrical, hydraulic or pneumatic operating system for operating the machine components.

Another object of this invention is to provide an arrangement whereby a mobile unit may be controlled by components mounted on the unit alone. No exterior components are required or utilized. By this arrangement there is no necessity to periodically move exterior reference components or other exterior parts which might require outside power sources. The only exterior part utilized in this invention is a fixed guide line staked along the ground adjacent the surface being processed.

It is another object of this invention to provide a control system which can completely govern a directional operation of a mobile surfacing machine. Directional control may be achieved in any plane and may be fully reversible so as to correct deviations from the position of the machine in any direction.

Another object of this invention is to provide an improved form of guide finger to contact a fixed guide string so as to compensate for the weight of string between supporting stakes. According to the invention, the depth control fingers bear upwardly on the string, compensating for the string weight and allowing for an increase in the distance between stakes.

These generalized objects will be more specifically identifiable in the following description which covers the application of this invention to a particular canal slip form and to a trench digging machine. It is to be understood that these two particular applications are merely exemplary and that the instant invention is designed so as to be adaptable to any common surfacing machine. The limits of the invention therefore are not to be drawn from this description of specific examples but rather from the claims which follow.

In the drawings:

FIGURE 4 is a top view of the machine shown in FIGURE 1;

FIGURE 5 is an enlarged side view taken along line 5—5 in FIGURE 3, and showing the controlling bleeder valve assemblies;

FIGURE 9 is a side view of a diaphragm assembly with a portion of the outer cover being broken away;

FIGURE 10 is a sectional view taken along line 10—10 in FIGURE 9;

FIGURE 11 is a vertical section view taken along line 11—11 in FIGURE 10;

FIGURE 14 is a side view of a trench digging machine equipped with the instant invention; and FIGURE 15 is a top view of the machine shown in FIGURE 14.

Figure 1:
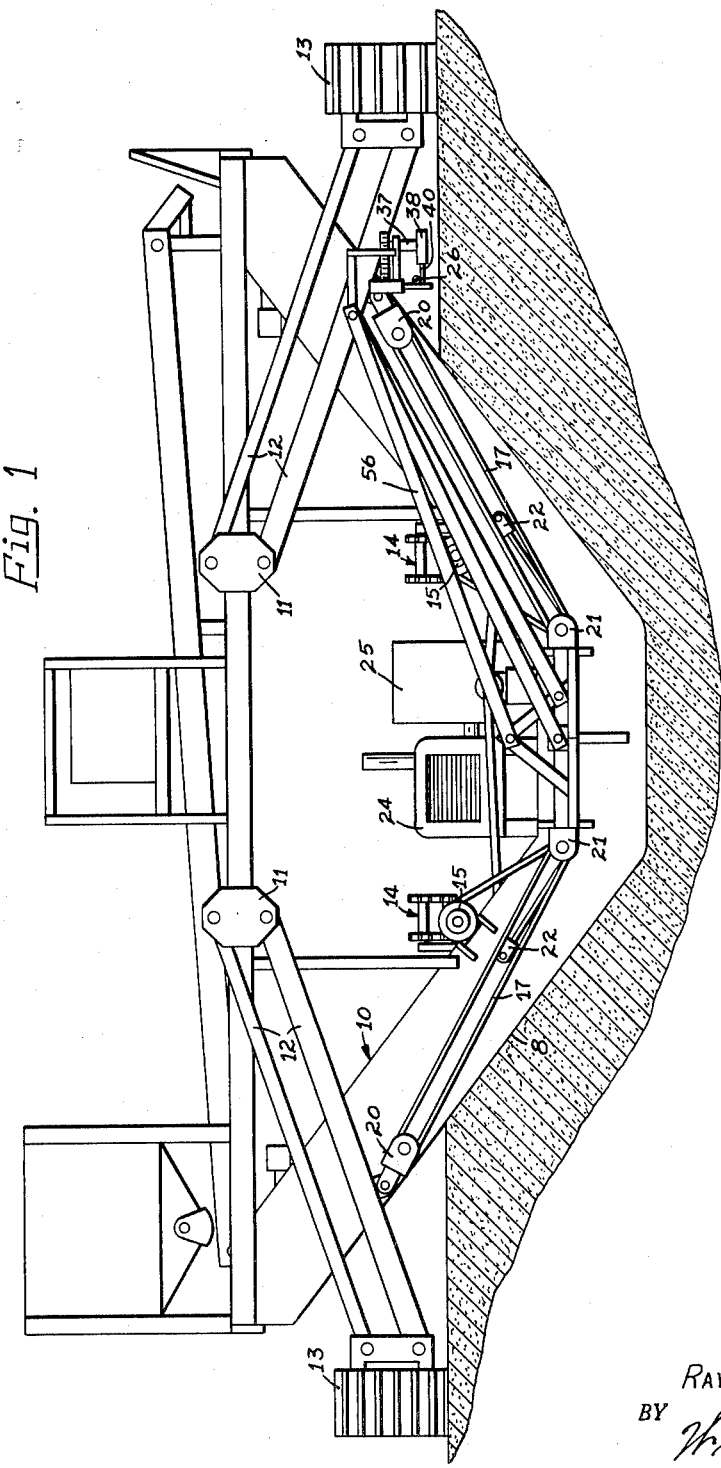
FIGURE 1 is a front view of a canal slipform provided with the instant control apparatus, the view being taken through a trench being lined.

The first embodiment of the present invention is illustrated in FIGURES 1 through 12, and is designed for use on a canal slipform of the type described in my copending patent application, Ser. No. 118,977, filed June 22, 1961. The precise details of the slip form construction are not of importance to an understanding of the control system to be described herein. Therefore such details will be eliminated from this discussion.

Basically the canal slipform consists of a movable boat 10 which is designed to ride transversely along a trapezoidal trench 8 and to deposit within the trench 8 a uniform, concrete lining 9. The boat 10 is preferably carried by a pair of side crawler track assemblies 13 extending outwardly on parallel arms 12, pivoted to fixed anchor plates 11. The crawler track assemblies 13 are preferably individually driven by hydraulic motors formed integrally therewith in conventional fashion. The crawler track assemblies 13 ride along the supporting ground surface adjacent the trench 8.

The boat 10 must travel along the trench 8 in a spaced relationship so as to produce the lining 9 having the desired uniform characteristics pertaining to depth, direction and compactness. It is therefore absolutely essential that the boat 10 be guided along the trench 8 to an exacting degree. It is also essential that the elevation of the boat 10 be accurately governed so as to produce a finished canal having the desired slope on its upper or outer surface. Since the compactness of the concrete in the lining 9 depends substantially upon the orientation of the boat 10 as it spreads the concrete within the trench 8, it is also essential that the longitudinal relationship of the boat relative to the trench be governed so that the front end of the boat 10 is not tilted to an undesirable degree relative to the rear end thereof. It is also absolutely essential that the lining 9 be level across its width. Therefore one must maintain the boat 10 in a transverse level position regardless of varying ground contour adjacent the trench 8 or within its walls.

Thus the directional controls of the slipform are concerned with four basic controls. These are: directional steering of the track assemblies 13 along the trench 8; elevational control of the boat 10 relative to the trench 8; transverse levelling of the boat 10; and longitudinal angular control of the boat 10. Each of these controls must be accurately governed relative to the ground through which the trench 8 has been cut before the passage of the boat 10.

The supporting crawler track assemblies 13 are positioned relative to the boat 10 by means of two winches 14, located respectively at each side of the boat 10. Each winch 14 is identical to the other instructor. Each includes front and rear cable drums 15 and 16 respectively. Wound about these drums 15 and 16 are front and rear cables 17 and 18 respectively. Both the front and rear cables are wound about a sheave 20 mounted on the underside of the lower arm 12 and also about a second sheave 21 mounted on the frame of the boat 10. The cable 17 is anchored at a fixed anchor 22 on the boat 10. The rear cable 18 is anchored to a cylinder assembly 23 mounted on the boat 10. The sheaves 20 and 21 provide the necessary mechanical advantage for the winches 14 so as to enable them to efficiently move the crawler track assemblies 13 relative to the boat 10 and to thereby vary the elevation of the boat 10 relative to the supporting ground. The crawler track assemblies 13 are capable of lifting the boat 10 entirely from the trench 8 for transporting purposes. The weight of the boat 10 is sufficient to spread the crawler track assemblies outward when tension on the cables 17 and 18 is released by the winches 14.

The boat 10 is provided with a central engine 24 and a hydraulic pump unit 25 of conventional design. The pump unit 25 is used to power the winches 14 by means of a conventional hydraulic motor geared thereto in a conventional fashion. Details of this hydraulic system are self evident and will not be further described herein.

As mentioned above, the directional control desired for such a slipform must be gauged relative to the trench 8 which is cut through the supporting ground surface. In order to provide an accurate guide for the controls to be described below, a line 26 is stretched alongside the trench 8 parallel to the directional planes desired for movement of the boat 10. Line 26 may be string or wire. Thus the elevation of the line 26 is parallel to the desired elevation of the upper surface of the final lining 9. The transverse position of the line 26 is parallel to the desired transverse path of the boat 10 within the trench 8. Thus the relative position of the line 26 in relation to the trench walls of the trench 8 is such that an object travelling along the line 26 will travel parallel to the desired motion of the boat 10 in any plane.

Figure 12:
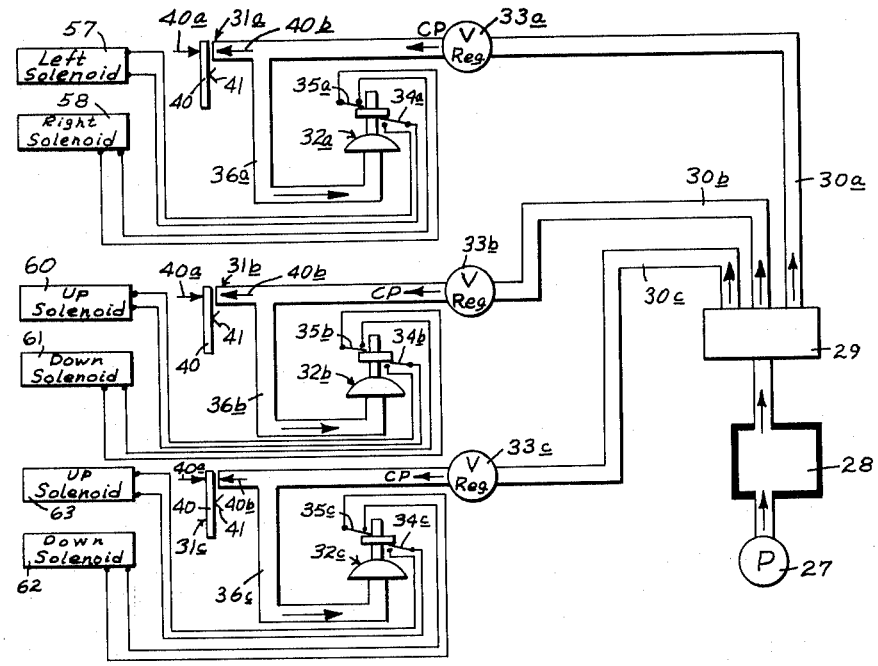
FIGURE 12 is a diagrammatic view of the pneumatic system utilized to control the canal slipform.

The basic control system can best be understood from the diagrammatic view illustrated in FIGURE 12. A differential pneumatic system is utilized having a pneumatic pump 27 leading to a supply reservoir 28 and a three way distributing valve 29. Valve 29 branches the air supply to three supply hoses 30a, 30b and 30c, which are equipped with a constant pressure output regulating valve 33a, 33b and 33c respectively. Each supply hose leads to a bleeder valve assembly designated generally as 31a, 31b or 31c. A control hose 36a, 36b, or 36c extends from the respectively bleeder valve assembly to a diaphragm assembly 32a, 32b or 32c respectively. Each diaphragm assembly includes a lower switch 34a, 34b or 34c, and an upper switch 35a, 35b, or 35c respectively.

Since each branch of this pneumatic system is basically identical, the following description will suffice for all. The supply hose 30a is designed to bring a constant pressure supply of air to the bleeder valve assembly 31a. The valve assembly 31a provides a branched outlet for this air supply, some of which may be drained at the valve assembly 31a, and some of which may be supplied by means of hose 36a to the diaphragm assembly 32a. The bleeder valve assembly 31a is designed to constantly drain a portion of the pressure from the final diaphragm assembly 32a. The bleeder valve assembly is diagrammatically shown with a pivoted arm 40 which rotates about a pivot 41. Two opposing forces are shown exerted upon the arm 40. The first of these is designated 40a and will be described below. The second is the force of the compressed air and is designated as 40b. The forces 40a and 40b should normally balance one another to provide a preset pressure drop at the bleeder valve assembly 31a. When this condition exists the diaphragm assembly 32a will be in equilibrium with both switches 34a and 35a in open positions as illustrated.

Should the force 40a be increased, the pressure drop at the bleeder valve assembly 31a will be lessened and therefore a higher pressure will be exerted at the diaphragm assembly 32a. This will result in the closing of the switch 35a, which will provide the necessary correction as described below. Once this correction has been accomplished the forces 40a and 40b will again be in equilibrium. Should the force 40a be lessened, the pressure drop at the bleeder valve assembly 31a will increase and the pressure exerted on the diaphragm assembly 32a will decrease so that the lower switch 34a is closed to thereby effect necessary correction until the forces 40a and 40b are again in balance. This corrective system is extremely sensitive since a small variation in air pressure will cause the respective switches 34a and 35b to be activated. However, the use of air as a monitor provides a time lag in correction to by-pass temporary deviations.

Figure 6:
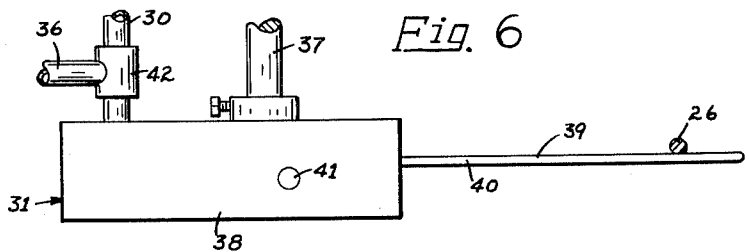
FIGURE 6 is a side view of a single bleeder valve assembly.
Figure 7:
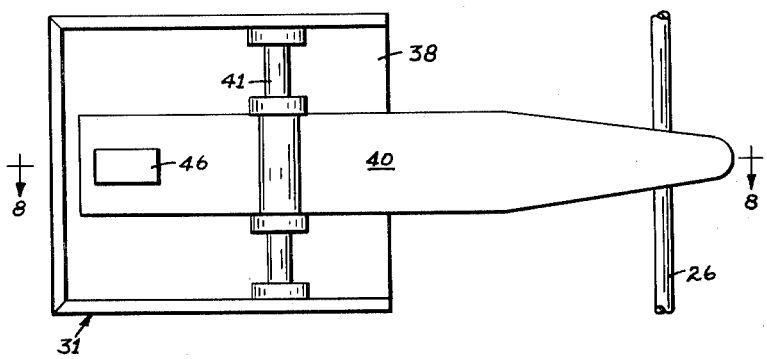
FIGURE 7 is a bottom view of the assembly shown in FIGURE 6.
Figure 8:
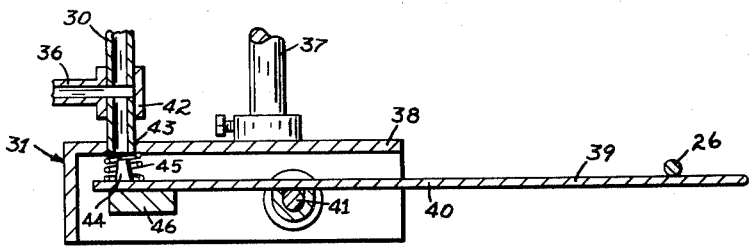
FIGURE 8 is a sectional view taken along line 8—8 in FIGURE 7.

The details of these control components will now be described. Each bleeder valve assembly 31a, 31b or 31c is identical in structure, although the mounting of the assembly depends upon its function. As shown in FIGURES 6 through 8, a typical bleeder valve assembly 31 is provided with a cylindrical mounting rod 37 secured to a rigid pivot frame 38. A pivot shaft 41 on the frame 38 rotatably mounts a carefully balanced pivot arm 40. The arm 40 includes an extended flat surface 39 which is adapted to ride along the line 26 in the desired plane. The end of arm 40 opposite to the wire 26 is provided with a counterweight 46 adapted to hold the arm 40 against the contacted surface of line 26. A spring 45 is positioned between the arm 40 and the adjacent surface of the frame 38 and also serves to exert a biasing force against the wire 26. It is to be understood that the arm 40 must be accurately balanced and that the force exerted on the line 26 is so slight as to cause no appreciable deviation in the position of the line 26 along its length. The frame 38 is provided with an opening through which is extended the outlet of a T-joint 42 which is pneumatically connected to a supply hose 30. The remaining outlet of the T-joint 42 is connected to the control hose 36 which extends to the control diaphragm assembly 32. The outlet 43 of the joint 42 cooperates with a restrictive partial stopper 44 formed on the adjacent surface of arm 40. Thus by varying the position of arm 40 about the pivot shaft 41 one may vary the restrictive orifice provided at outlet 43 and thereby vary the pressure drop at the T-joint 42. The entire assembly must be accurately balanced and must respond to very slight changes in pressure against the line 26. The precise fitting of each part is essential to its effective utility.

As seen in FIGURES 6–8, the arm 40 used to detect elevational deviation of the apparatus relative to line 26 rides along the lower line surface. In practice, this position allows the arm 40 to offset the slight line weight and resulting sag due to this weight. The pressure of arm 40 upward on line 26 should be one half of the line weight between supporting stakes. If two arms 40 are utilized for separate purposes, each should exert a pressure of one fourth of the line weight, so that the total resulting upward pressure will be one half of the line weight between each pair of supporting stakes. In this manner, the line weight is equalized along its average length, allowing longer distances between stakes to be utilized.

The diaphragm assembly 32 is also common to each control component utilized on the machine. The details of this assembly 32 are illustrated in FIGURES 9 through 11.

The diaphragm assembly 32 is provided with a mounting base 47 in which is secured a collapsible diaphragm 48. The diaphragm 48 includes a pair of sealed resilient elements 48a and 48b. Fixed to the upper element 48a is a movable disk 50. Disk 50 is slidable along a central supporting shaft 41. At each side of the mounting base 47 is a fixed mounting screw 51. Each screw 51 is threaded along its length and is provided at the top with a fixed connection to a plate 52, which in turn mounts the shaft 54 at its center. A spring 53 is compressed with a slight force between the top surface of the disk 50 and the plate 52 so as to exert a force on the disk 50 in opposition to the upper diaphragm element 48 and to thereby balance the mechanical components of the diaphragm assembly 32. The entire assembly is perfected by a cylindrical outer cover 55 so as to present an entirely closed system.

Each screw 51 supports a small switch 34 or 35 located respectively below or above the position of the movable disk 50. The lower switch 34 is provided with a movable contact 34d which may abut the lower surface of disk 50. Conversely the upper switch 35 has a movable contact 35d which may abut the upper surface of disk 50. The clearance between the disk 50 and the two switches 34 and 35 may be readily adjusted by manipulation of the mounting screws 51. It is preferable that a minimum clearance be provided between the equilibrium position of disk 50 and the contact 34d and 35d so that while this equilibrium condition exists, neither switch 34 or 35 will be closed by contact with the disk 50.

The manner in which this control system effects the necessary directional control of the moving boat 10 will now be described. The bleeder valve assemblies 31a, 31b and 31c are mounted on the right hand side of the machine as seen in FIGURE 1. The valves are located in contact with the fixed guide line 26 which may be supported on the ground surface by any suitable fixed means. The length of line 26 will depend upon the ground contour, the strength of line being used, and requirements of each individual job. The first valve 31a is utilized to effect lateral steering control of the boat 10. The valve 31a is shown mounted on a forwardly extended boom 56 which is rigidly mounted on the frame of the boat 10. The forward position of the valve 31a is desirable so as to provide additional leverage and sensitivity for detecting very slight changes in the directional steering of the boat 10. The position of the valve 31a should be accurately adjustable relative to the line 26 so that the desired orientation of the boat 10 may be guaranteed. The precise form of this adjustment is immaterial to the basic concept of this invention. The switches 34a and 35b of the diaphragm assembly 32 controlled by the valve assembly 31a are wired respectively to a pair of solenoids 57 and 58. The first solenoid 57 controls a hydraulic valve (not shown) which causes the driving fluid motor on the left hand track assembly 13 as seen in FIGURE 1, to override the right hand track assembly 13. The solenoid 58 similarly controls the speed of the right hand track assembly 13 relative to the left hand track assembly 13 as seen in FIGURE 1. Thus, if the boat 10 begins to veer to the right as seen in FIGURE 1, the pressure of the line 26 against the arm 40 of the bleeder valve assembly 31a will cause the upper switch 35a of the associated diaphragm assembly 32a to be closed and thus energize the right solenoid 58. This will cause the right hand track assembly 13 to run faster than the left hand track assembly 13 and thereby correct the steering of the boat 10 until the pressure of the wire 26 on the pivot arm 40 again reaches the desired equilibrium. At this time the boat 10 will again be oriented properly relative to the line 26 and the desired surface on the lining 9. If the unit should over correct and veer slightly to the left as seen in FIGURE 1, the pressure of line 26 will be below the equilibrium condition and the lower switch 34a of the diaphragm assembly 32a will be closed, thus energizing the left solenoid 57. This will have the opposite effect and will cause the left hand track assembly 13 to run faster than the right hand track assembly 13. Again the controls will alternate until the desired equilibrium position is achieved. Thus the steering of the boat 10 will be accurately monitored at all times relative to a fixed guide line 26.

The second set of controls going down FIGURE 12 effect the vertical positioning of the boat 10 relative to the line 26. This set of controls insures the proper thickness in the concrete lining 9 and also insures the proper grade on the lining surface. The elevational position of the boat 10 is monitored by the second bleeder valve assembly 31b, shown in FIGURE 5. This bleeder valve assembly 31b is mounted on a fixed rod 62, fixed to the frame of boat 10 and parallel thereto, directly above the trench being lined with concrete. The positioning of the valve assembly 31b on the frame of boat 10 may be varied, depending upon the circumstances of each job. As shown in FIGURE 5, the elevation of the valve assembly 31b is roughly determined by the position on the rod 62 and is accurately positioned by means of a threaded shaft 63. The pivot arm 40 of the valve assembly 31b rests directly below the wire 26 in contact therewith. Thus, if the boat 10 rises slightly so as to cause the line 26 to exert additional pressure on the arm 40 of the valve assembly 31b, the pressure at diaphragm assembly 32b will be increased, thereby closing the upper switch 35b. Switch 35b is wired to a solenoid 61 which is operative to cause the winch 14 adjacent the wire 26 to let out the cables 17 and 18 entrained on its drums 15 and 16 respectively. This action therefore lowers the boat 10 within the trench 8. The lowering action will continue until the force on the arm 40 of the bleeder valve assembly 31b again reaches the desired equilibrium point. Should the boat 10 be lowered within the trench 8, the force on the bleeder valve assembly 31b will be increased and will thereby energize the upper switch 35b of the diaphragm assembly 32b. This will cause the switch 35b to energize a second solenoid 60 which will raise the side of the boat 10 by causing a valve to operate the adjacent winch 14 and thereby reel in the front and rear cables 17 and 18 entrained on its drums 15 and 16 until the pressure of the wire 26 on the valve assembly 31b again attains the equilibrium point. Thus the elevation of the right hand side of the boat as seen in FIGURE 1, will be maintained at a constant position relative to the fixed line.

It is also desirable to maintain both sides of the boat 10 in a transversely level position since the surfaces of the finished lining 9 are normally desired in level planes. This control may be accomplished by a purely internal system, not shown in the drawings, but described in my Patent No. 3,118,088, granted January 14, 1964 for Level Sensitive Control Circuit. By utilizing the level control circuit shown in this patent, one may monitor the level of the left hand side of the boat 10, as seen in FIGURE 1, relative to the right hand side of the boat 10 and thereby control the winch 14 opposite to the line 26 so as to maintain the boat 10 in a permanently monitored transverse level position. The utilization of this cross leveling device is evident from a study of my prior disclosure and need not be further elaborated herein. It is to be understood that other leveling devices may be utilized across the boat 10 to control the remaining winch 14 and thereby to maintain the boat 10 in a transverse level position.

Figure 2:
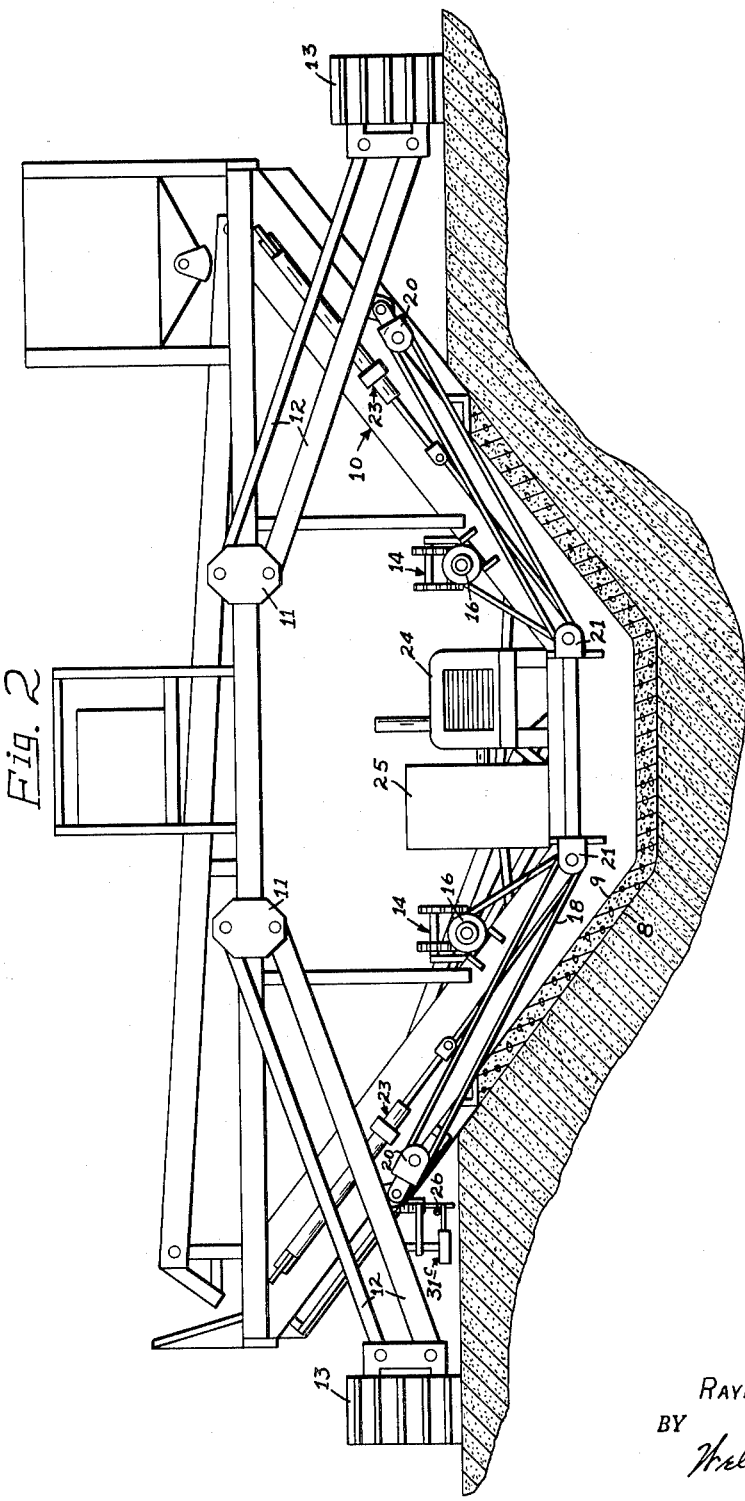
FIGURE 2 is a rear view of the machine as seen in FIGURE 1.
Figure 3:
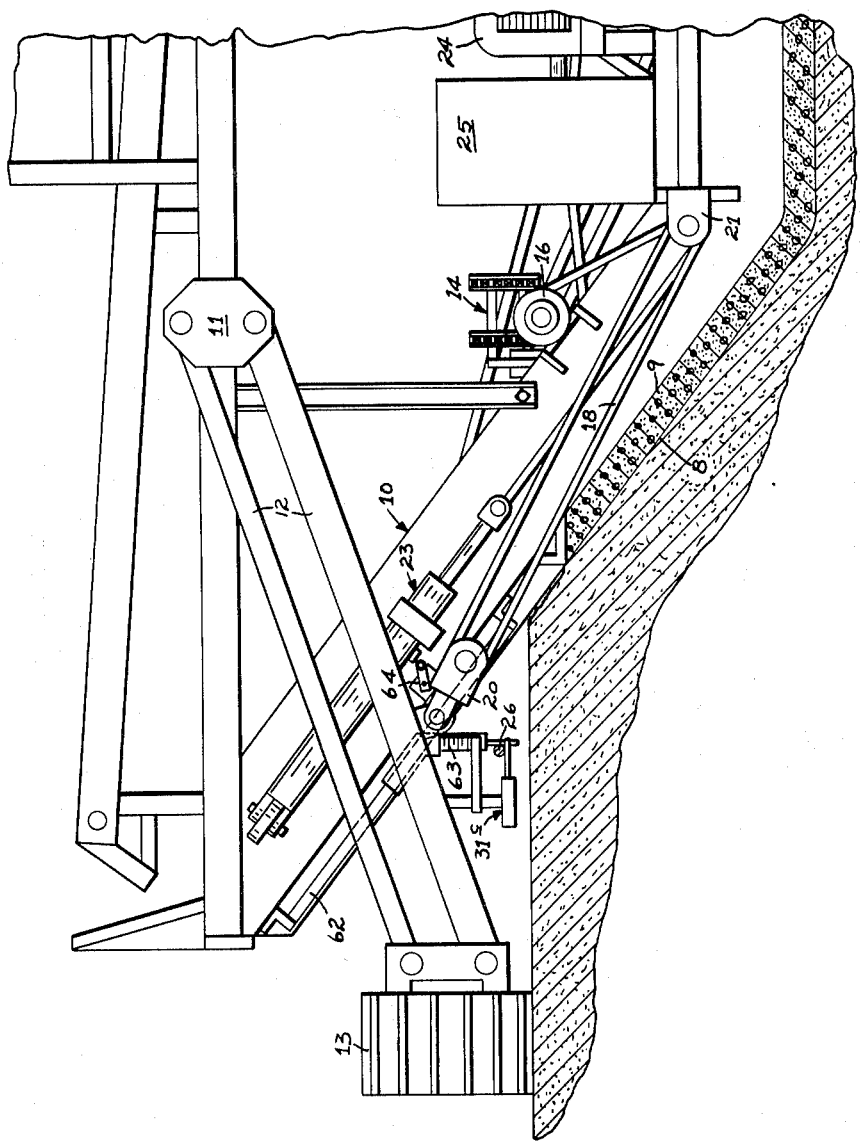
FIGURE 3 is an enlarged view of the left hand end of the machine as seen from the rear.

The fourth control is concerned with the longitudinal tilting of the boat 10. Depending upon the consistency of the concrete being poured the boat 10 should be slightly inclined so as to properly spread the concrete and trowel the upper surface thereof. In order to maintain this tilting at an even degree a third bleeder valve assembly 31c is shown in FIGURES 2, 3 and 5. The valve assembly 31c is located adjacent the valve assembly 31b and is mounted on the boat 10 in precisely the same manner as the valve assembly 31b. The two valve assemblies 31b and 31c co-act to maintain the desired elevational position of both the front and rear ends of the boat 10. Since the valve assembly 31b monitors both the front and rear ends of the boat 10 by manipulation of both cables 17 and 18 adjacent the line 26, the further manipulation of the rear cable 18 at each side of the boat completes this elevational control. The valve assembly 31c is associated with the diaphragm assembly 32c having upper and lower switches 35c and 34c connected respectively to solenoids 62 and 63. The solenoid 62 controls a valve (not shown) which causes the cylinder assemblies 23 at each side of the boat 10 to expand and thereby lengthen the effective length of the associated rear cable 18. The solenoid 63 controls another valve (not shown) which when energized, causes the cylinder assemblies 23 to contract and thereby lessen the effective length of the associated rear cables 18. Should the rear end of the boat 10 drop below the desired position, the force on the pivot arm 40 of the bleeder assembly 31c will lessen and thereby decrease the pressure at diaphragm assembly 32c until the lower switch 34c closes and causes the solenoid 63 to raise the rear end of the boat 10 by contracting the cylinder assemblies 23. Similarly if the rear end of the boat 10 should rise above the desired level relative to its front end, the pressure on the arm 40 will be increased until the upper switch 35c is closed, thereby causing the solenoid 62 to expand the cylinder assemblies 23 and thereby lower the rear end of the boat 10 by extending the rear cables 18.

A safety control is provided in association with the cylinder assemblies 23. This consists of a switch 64 mounted on the frame of the boat 10 directly below each cylinder assembly 23. If the tension on the rear cables 18 becomes slack for any reason, the cylinder assemblies 23 will drop about their upper pivots and contact the switch 64 associated therewith. The switch 64 is preferably connected to a control circuit for the main engine 24 and all associated controls so that activation of the switch 64 will cause the entire operation of the boat 10 to cease until the valve function is corrected.

The above directional control equipment provides accurate monitoring of the orientation of the boat 10 relative to the ground and trench in every plane. Each directional control is integrated with the others so that the final surface of the lining 9 is precisely that desired. The controls require no manual manipulation and correct themselves automatically when any deviation is detected relative to the guide line 26.

Figure 13:
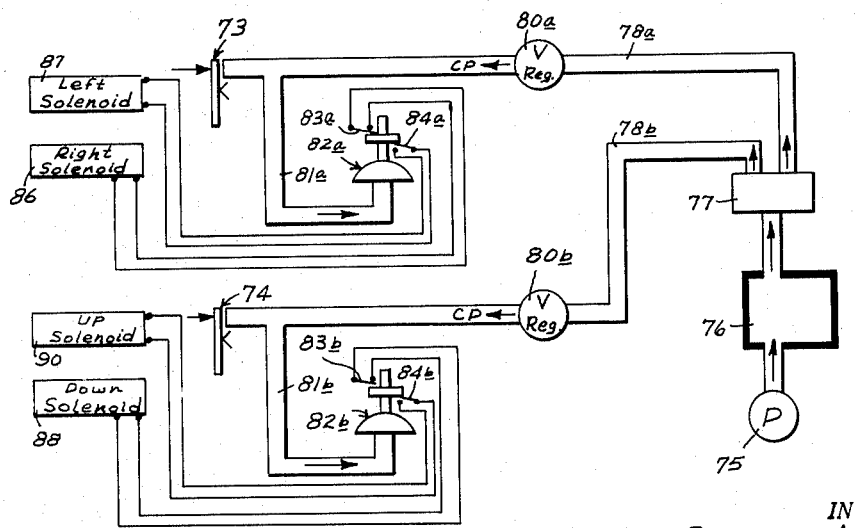
FIGURE 13 is a diagrammatic view of the pneumatic system utilized to control a typical trench digging machine.

These controls are readily adaptable to any surfacing machine. FIGURES 13 through 15 show a modified system adapted to control a trench digging machine 65. The details of this machine are unimportant to an understanding of the instant invention. It consists primarily of a tractor 66 and a digging wheel 67. The tractor 66 is provided with independently controllable forward tracks 68 and 70. The digging wheel 67 is mounted on a vertically adjustable frame 71 which is vertically positioned by means of a pair of hydraulic cylinders 72 mounted on the frame of the tractor 66. The only directional controls important in such a machine are steering and vertical positioning of the wheel 67. These two controls are provided by means of a pair of bleeder valve assemblies 73 and 74. The valve assembly 73 effects steering control of the tractor 66 while the valve assembly 74 effects elevational control of the digging wheel 67.

The control circuitry is diagrammatically illustrated in FIGURE 13. It includes a pump 75, a reservoir 76, distributing valve 77 and supply hoses 78a and 78b. The supply hoses 78a and 78b are provided with suitable constant pressure regulator valves 80a and 80b respectively. The bleeder valve assemblies 73 and 74 are identical to that previously described. They are connected by means of control hoses 81a and 81b respectively, to a pair of diaphragm assemblies 82a and 82b. The diaphragm assemblies 82a and 82b are provided with upper switches 83a and 83b and lower switches 84a and 84b respectively.

The valve assemblies 73 and 74 ride along a fixed guide line 85 which corresponds to the previously described line 26. It must be oriented parallel to the desired steering direction of the tractor 66 and parallel to the desired bottom surface of the trench being dug by the wheel 67. If the tractor 66 veers to the right, the pressure on the valve assembly 73 will be increased as it abuts the wire 85. This will cause the upper switch 83a to activate a solenoid 86 which will slow down the track 70 or speed up the track 68, depending upon the type of steering control in the tractor 66. The solenoid 86 will preferably operate a hydraulic or pneumatic steering system for the two tracks 68 and 70. Similarly the solenoid 87 wired to the lower switch 84a controls a suitable steering mechanism so as to cause the track 70 to over ride the track 68 and thereby steer the tractor 66 to the right. It should be evident from the above description that this control mechanism will also attain an equilibrium position wherein the tractor 66 will be guided parallel to the line 85.

The elevational control of the digging wheel 67 is attained by the use of a second valve assembly 74 which vertically contacts the fixed guide line 85. The valve assembly 74 is associated with a diaphragm assembly 82b having upper and lower switches 83b and 84b associated with solenoids 88 and 90 respectively. The solenoid 88 is preferably connected to a suitable valve mechanism (not shown) which causes the cylinder assembly 72 to expand and thereby lower the position of the wheel 67 relative to the line 85. The solenoid 90 is preferably connected to another valve mechanism designed to have an opposite effect and thereby contract the cylinder 72 to raise the wheel 67. The corrective operation of the valve 74 should be evident from FIGURE 13 and from the prior discussion of the elevational controls on the slipform assembly.

Thus I have disclosed a workable automatic directional control which may be used to operate any desired directional system on a surfacing machine so as to guide the machine relative to a fixed reference line. The control assembly is extremely accurate and can guide a large machine to a tolerance of a few thousandths of one inch deviation from the desired position. It is to be understood that the electrical components shown in FIGURES 12 and 13 may be entirely eliminated and replaced by pneumatic or hydraulic components so as to by-pass the intermediate electrical features which are undesirable in many installations. In other words, the diaphragm assemblies 32 and 82 may directly operate hydraulic or pneumatic controls to correct the position of the machine being monitored. These and other modifications may occur to one skilled in the field without deviating substantially from the basic concept of my completely automatic control system. Therefore only the following claims are intended to define and restrict the extent of my invention.

Having thus described my invention, I claim:

1. In combination with a surfacing machine having a movable framework:
    fluid operated means mounted on said framework adapted, when activated, to effect changes in the orientation of the framework relative to the material being surfaced;
    guide means fixed relative to the material being surfaced;
    air operated control means on said framework operatively connected to said fluid operated means to selectively activate said fluid operated means;
    a source of pressurized air;
    conduit means operatively connected to said source of pressurized air and to said air operated control means whereby said air operated control means is subjected to the pressure of air supplied thereto, said conduit means including branched variable bleeder means fixedly mounted on said framework having a movable element in contact with said guide means, said bleeder means being interposed in said conduit means between said air operated control means and said source of pressurized air, whereby motion of the movable element of said bleeder means due to motion of said framework relative to said guide means will cause a corresponding variance in the pressure of air delivered from said source to said air operated control means.

2. In combination with a surfacing machine having a framework including two relatively movable portions adapted to effect changes in the orientation of the machine by movement relative to one another:
   a hydraulic cylinder assembly operatively connected between the two framework portions adapted to position the two portions relative to one another;
   guide means fixed relative to the material being surfaced and extending parallel to the path of the machine during the surfacing operation;
   air operated control means mounted on the machine framework including a movable diaphragm element and means engageable with said movable diaphragm element operatively connected to said hydraulic cylinder assembly adapted to selectively expand or contract said hydraulic cylinder assembly in response to movement of said diaphragm element;
   a source of pressurized air mounted on the machine framework;
   air conduit means connecting said source and said air operated control means, including a branched variable bleeder valve located at a fixed position on said framework, said bleeder valve including a movable valve element in operative contact with said guide means and adapted to be controlled thereby, whereby variations in pressure on said movable valve element by movement thereof relative to said guide means will result in a corresponding variation in the air pressure directed to said air operated control means through said air conduit means.

3. In combination with a surfacing machine having a framework including a first supporting portion adapted to travel along the ground and a second movable portion supported thereby adapted to carry the surfacing elements:
   a hydraulic cylinder assembly operatively connected between the two framework portions adapted to selectively vary the elevation of said second movable portion relative to said first movable portion;
   guide means located adjacent the path of the machine, said guide means including a line located in a fixed position parallel to the desired surface;
   pneumatic control means mounted on the first portion of said machine framework including a movable control element and means engageable with said movable control element operable in response to movement thereof operatively connected to said hydraulic cylinder assembly to selectively operate said hydraulic cylinder assembly in response to movement of said movable control element;
   a source of pressurized air mounted on the first portion of said machine framework;
   air conduit means connecting said source and said pneumatic control means, including a branched variable bleeder valve located at a fixed position on the first portion of said framework, said bleeder valve including a movable controlling element in vertical contact with the lower surface of said line, whereby variations in the level of said first portion of the framework relative to said line will effect a corresponding variation in the pressure directed to said pneumatic control means through said air conduit means.

4. In combination with a machine having a vehicular framework adapted to travel on a supporting ground surface:
   hydraulically operated steering means mounted on said framework adapted, when activated, to effect lateral steering of the framework relative to the supporting ground surface;
   guide means located adjacent the path of the machine, said guide means including a line located in a fixed position parallel to the desired path of the machine framework relative to the supporting ground surface;
   pneumatic control means mounted on the machine framework including a movable control element and means engageable with said movable control element operable in response to movement thereof operatively connected to said hydraulically operated steering means to selectively operate said steering means in response to movement of said movable control element;
   a source of pressurized air mounted on the machine framework;
   air conduit means connecting said source and said pneumatic control means, including a branched variable bleeder valve located at a fixed position on said machine framework, said bleeder valve including a movable controlling element in horizontal contact with said line, whereby variations in the lateral position of said machine framework relative to said line will effect a corresponding variation in the pressure directed to said pneumatic control means through said air conduit means.

5. In combination with a surfacing machine having a movable framework;
   and means mounted on said framework adapted, when activated, to effect changes in the orientation of the framework relative to the material being surfaced;
   a fixed guide line located on the material being surfaced in a position parallel to the desired direction of movement of the machine;
   and control means on said framework operatively connected to said first named means to selectively activate said first named means, said control means including an element biased upwardly in sliding engagement with the bottom of said guide line.

6. An apparatus as defined in claim 5 wherein said line is supported on the material being surfaced by longitudinally spaced fixed supports;
   the total normal upward pressure on said line exerted by said element being equal to half of the weight of said line between each pair of said supports.

References Cited by the Examiner
UNITED STATES PATENTS

| 1,979,479 | 11/1934 | Leland | 192—125.2 |
| 2,362,490 | 11/1944 | Lewis | 61—63 |
| 2,694,581 | 11/1954 | Helmle | 180—9.52 |
| 2,844,882 | 7/1958 | Earley. | |
| 2,864,452 | 12/1958 | Guntert. | |
| 2,982,104 | 5/1961 | Petersen | 61—63 |
| 3,095,938 | 7/1963 | Bertelsen | 180—9.52 X |

CHARLES E. O'CONNELL, *Primary Examiner.*

JACOB L. NACKENOFF, *Examiner.*

N. C. BYERS, *Assistant Examiner.*